INVENTOR.
JOHN F. MAXFIELD
BY
Whittemore, Hulbert & Belknap
ATTORNEYS 3,147,344

ANONYMOUS CALL-CHECKING DEVICE

John Freeman Maxfield, 2217 Manchester Road, Ann Arbor, Mich.; David K. Maxfield and Grace K. Maxfield, guardians of said John F. Maxfield, a minor, assignors of thirty percent to W. Harold Peet, Ann Arbor, Mich.

Filed Sept. 26, 1960, Ser. No. 58,509
9 Claims. (Cl. 179—18)

This invention relates generally to telephone systems and refers more particularly to circuits for holding connections in automatic dial switching exchanges.

Subscribers are sometimes bothered by calls which are repeatedly made to their lines by persons whose sole object is to maliciously annoy. Threats or extortional requests may even be made by telephone. It is highly desirable to trace the origin of such calls. While in manual exchange areas it is comparatively simple for an operator to trace the origin of a call at the request of the called party, it is very difficult to trace a call in an automatic dial switching exchange area since an established connection is interrupted as soon as the calling party hangs up.

It is therefore the object of my invention to provide facilities in an automatic dial switching exchange area to enable any subscriber who has complained of being annoyed by malicious calls to control the holding of the connections.

In accordance with the invention, when a subscriber enters a complaint, my call-holding device is connected to his telephone. No modification or additions to the automatic dial central office switching equipment are needed. The call-holding device is equipped with a switch to disconnect it from the subscriber's telephone when normal calls are being placed or received.

When a subscriber whose telephone is so equipped receives an annoyance call, he operates the switch on the call-holding device to prevent the calling party from interrupting the connection. Then by means of another separate telephone the subscriber requests the central office switchman to determine the origin of the call. The call is held until the subscriber restores the switch on the call-holding device to the "off" position.

Other objects and advantages of the invention will become apparent as the following description proceeds, especially when considered with the accompanying drawing, wherein.

For the purpose of illustration, I have shown my invention as applied to an automatic dial switching system of the well known step-by-step type, although it is to be understood that the invention is equally applicable to almost all types of automatic dial switching systems.

Figure 1:
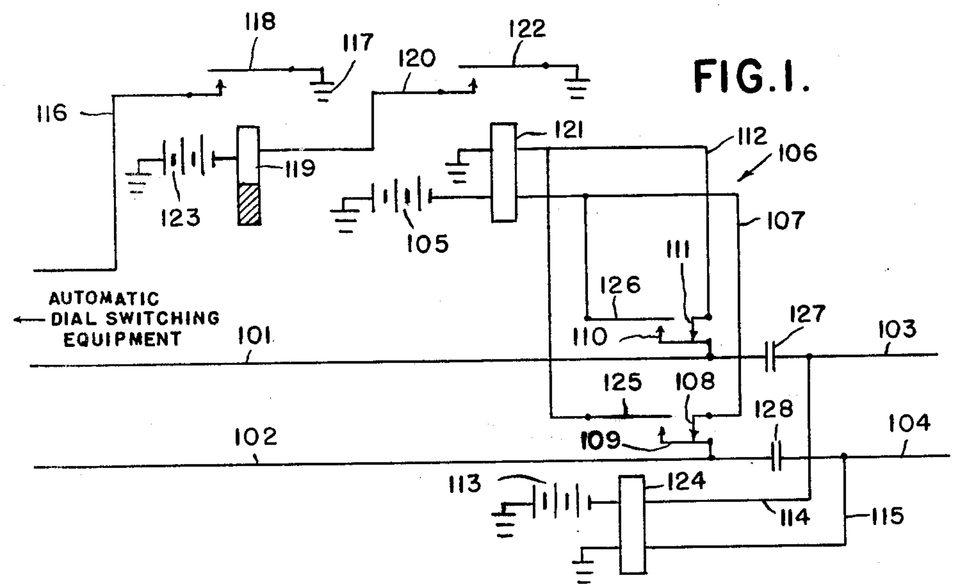
FIG. 1 shows schematically that part of the automatic dial central office equipment circuit which is utilized in holding the connection.

Referring to FIG. 1, there is shown that part of a step-by-step connector type circuit which is used by my call-holding device to prevent the connection from being interrupted. Leads 101 and 102 extend through the automatic dial switching equipment (not shown) to the calling telephone. Leads 103 and 104 extend to the called telephone. 105 is a current source for supplying the calling telephone with talking current through leads 101 and 102. The circuit 106 from the current source to the leads 101 and 102 includes lead 107, fixed contact 108, movable contact 109, the leads 102 and 101, movable contact 110, fixed contact 111 and lead 112 to ground. When the calling party lifts his handset from the switch hook the circuit is closed across leads 101 and 102 to supply the talking current.

When the called party answers his telephone, he closes the circuit across leads 103 and 104 to complete a circuit through current source 113 by way of leads 114 and 115 to supply talking current for the called telephone.

Circuit 116 also extends to the automatic dial switching equipment and is provided to complete a circuit to ground 117 and thereby hold the dial switching equipment. In order to close circuit 116 to ground while the calling party circuit is closed, a contactor 118 is provided, operated by release relay 119 in circuit 120. The front bridge relay 121 is energized by the current source 105 when the calling circuit is closed to close its contactor 122 and thereby close the circuit 120 through the current source 123 to energize the release relay which in turn closes its contactor 118. The release relay is of the slow-to-release type.

When the called party answers his telephone to close the circuit through the current source 113 for supplying talking current, back bridge relay 124 is energized to pull in its contactors 125 and 126. This closes the circuit between the contacts 109 and 125 and thereafter opens the contacts 108 and 109. At the same time the contacts 110 and 126 are closed and thereafter the contacts 110 and 111 are opened. The contacts 108, 109 and 125, and the contacts 110, 111 and 126 of the back bridge relay 124 are of the make-before-break type, as is apparent. The operation of the back bridge relay 123 thus reverses the polarity of the leads 101 and 102.

127 and 128 designate capacitors which bridge the voice-frequency currents around the front bridge relay 121 and the back bridge relay 124.

When the calling party hangs up opening the circuit across leads 101 and 102, the front bridge relay 121 is de-energized opening the circuit to release relay 119 through contact 122, thereby opening the circuit 116 at 118 to release the automatic dial switching equipment. Therefore, when the calling party hangs up, the dial switching equipment is released and normally the call cannot be traced.

Figure 2:
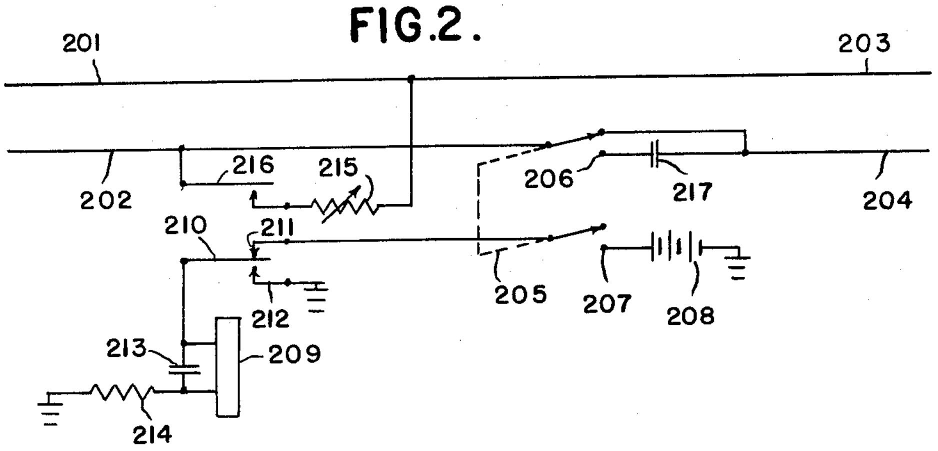
FIG. 2 shows the circuit for one type of my call-holding device.

FIG. 2 illustrates one form of call-holding device. The circuit there shown may be housed in a separate case to be connected to the telephone of a subscriber who has been receiving annoyance calls. The leads 201 and 202 extend to the automatic dial central office and may be considered as in communication with leads 103 and 104 in FIG. 1. A suitable plug or terminal may be provided on the call-holding device for plugging in the leads 201 and 202 to a wall box to which the telephone itself would otherwise be connected. The leads 203 aud 204 are connected to the called telephone. Normally the switch 205 is in the position shown, rendering the call-holding device inoperative and permitting normal telephone conversations.

When it is desired to hold a call, the switch 205 is transferred to the terminals 206 and 207 to connect a current source 208 to relay 209 through its movable contact 210. The contact 210 vibrates rapidly between the contacts 211 and 212 alternately completing the circuit to the relay and grounding the relay. Relay 209, capacitor 213, and resistor 214 are so connected that the relay is caused to pulsate rapidly.

The variable resistor 215 is connected to and disconnected from leads 201 and 202 once in every pulse of relay 209 since the movable contactor 216 of the relay is pulsed or caused to vibrate by the relay to open and close the circuit to the resistor. Switch 205 also has placed the called telephone in series with the capacitor 217 so that the telephone will not interfere with the proper operation of the call-holding device. Since capacitor 217 passes voice-frequency current, the telephone may be used by the subscriber to monitor the operation of the call-holding device.

Every time resistor 215 is connected to leads 201 and 202 by the pulsing of relay 209, the back bridge relay 124 in FIG. 1 is caused to operate, being connected to the variable resistor 215 by leads 103 and 104. Thus the back bridge relay 124 pulsates in synchronization with relay 209. Every time that the make-before-break contacts of the back bridge relay 124 transfer, a momentary shunt is placed on the front bridge relay 121. If the calling party hangs up his telephone, relay 121 will pulsate at twice the rate of relay 124, because of the action of the make-before-break contacts. Every time the front bridge relay 121 closes its contact 122, release relay 119 is operated. As mentioned above, the release relay is of the slow-to-release type, and its release period is longer than the interval between operations of relay 121 so that it will not open its contact 118 to remove the ground from lead 116 during the pulsing of the front bridge relay. Hence the circuit 116 remains closed and accordingly the automatic dial switching equipment will be held.

The subscriber may then, by means of another telephone, call the central office for a determination of the origin of the call. The automatic dial switching equipment is held until the subscriber restores the switch 205 on the call-holding device to the illustrated position.

Figure 3:
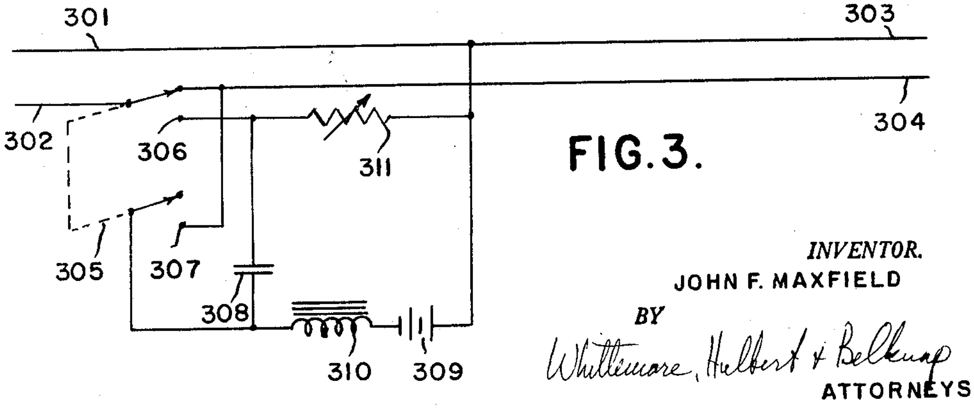
FIG. 3 shows the circuit for another type of my call-holding device.

A call-holding device having different wiring is shown in FIG. 3. Leads 301 and 302 are adapted to be plugged into the subscriber's telephone outlet for communication with the leads 103 and 104 from the central office. Leads 303 and 304 are connected to the called telephone. With switch 305 in the illustrated position, the call-holding device is rendered inoperative and the called telephone may be used for normal conversations. When the switch is moved to contacts 306 and 307, the called telephone is isolated from the back bridge relay 124 in FIG. 1 by capacitor 308. The subscriber's telephone is now supplied with talking current from battery 309 connected in series with choke coil 310. Variable resistor 311 is connected across leads 301 and 302 by switch 305. Resistor 311 is adjusted to a valve such that insufficient current flows through it to energize the back bridge relay 124.

When the calling party hangs up his telephone, the collapse of the magnetic field of front bridge relay 121 creates a surge of current that passes through capacitors 127 and 128 and causes relay 124 to partially transfer its make-before-break contacts. Relay 124 remains partially energized due to the weak current flowing through resistor 311. The partial energization of relay 124 is sufficient to maintain the make-before-break contacts in the state of partial transfer, that is in which the make contacts 109, 125 and 110, 126 have closed, and the break contacts 108, 109 and 110, 111 have not opened. This places a shunt on the front bridge relay 121 which causes it to be energized through the current source 105 and circuit 106. The energized relay 121 closes its contact 122 to energize release relay 119 which in turn closes its contact 118 to hold a ground on lead 116. Thus, the automatic swinging equipment is prevented from being released.

What I claim as my invention is:

1. Apparatus for holding a telephone call in an automatic dial switching telephone exchange having first means including a first current source and a first circuit operable to supply talking current to the calling circuit and automatically operable to interrupt the current when the calling circuit is opened, second means for holding the dial switching equipment and having means including a switch to actuate the same when closed and to de-actuate the same when open, a first relay in said first circuit energized by said first means during the operation thereof to close said switch and de-energize in response to the automatic operation aforesaid of said first means to open said switch, third means including a second current source and a second circuit operable to supply talking current to the called circuit, and relay means including make-before-break contacts in said first circuit and a second relay in said second circuit operable by said second current source to reverse said contacts and thereby reverse the polarity of the calling circuit; said apparatus comprising mechanism for holding the dial switching equipment after the calling circuit is opened, said mechanism comprising means for shunting said first circuit between said first current source and said first relay to energize the latter including means for energizing said second relay with a current sufficient only to hold closed the make contacts without opening the break contacts.

2. The apparatus defined in claim 1 wherein said last mentioned means is located in the called party circuit and is manually controlled to render the same selectively operative or inoperative.

3. Apparatus for holding a telephone call in an automatic dial switching telephone exchange having first means operable to supply talking current to the calling circuit and automatically operable to interrupt the current when the calling circuit is opened, second means for holding the dial switching equipment and having means including a slow-to-release relay to actuate the same when energized and a switch to energize said relay when closed and to de-energize said relay when open, and relay means energized by said first means during the operation thereof to close said switch and de-energized in response to the automatic operation aforesaid of said first means to open said switch; said apparatus comprising mechanism for holding the dial switching equipment after the calling circuit is opened, said mechanism including means for applying a pulsing current to said slow-to-release relay of a frequency such that the period between pulses is less than the delayed release period of said relay, whereby said relay remains continuously operated.

4. Apparatus for holding a telephone call in an automatic dial switching telephone exchange having first means including a first current source and a first circuit operable to supply talking current to the calling circuit and automatically operable to interrupt the current when the calling circuit is opened, second means for holding the dial switching equipment and having means including a slow-to-release relay to actuate the same when energized and a switch to energize said relay when closed and to de-energize said relay when open, a first relay in said first circuit energized by said first means during the operation thereof to close said switch and de-energized in response to the automatic operation aforesaid of said first means to open said switch, third means including a second current source and a second circuit operable to supply talking current to the called circuit, and relay means including make-before-break contacts in said first circuit and a second relay in said second circuit operable by said second current source to reverse said contacts and thereby reverse the polarity of the calling circuit; said apparatus comprising mechanism for holding the dial switching equipment after the calling circuit is opened, said mechanism comprising means for shunting said first circuit between said first current source and said first relay to energize the latter including means for energizing said second relay with a pulsating current to pulse said make-before-break contacts and energize said first relay with a pulsating action sufficient to intermittently close and open said switch at a rate such that the open periods are of shorter duration than the delayed release period of said slow-to-release relay, whereby the latter remains energized.

5. The apparatus defined in claim 4 wherein the means for energizing said second relay with a pulsating current is located in the called party circuit and is manually controlled to render the same selectively operative or inoperative.

6. Automatic dial switching telephone apparatus including a calling telephone circuit and switching equipment, a slow-to-release relay in the switching equipment responsive to the calling telephone circuit to maintain the calling telephone circuit connected to a called telephone circuit, means for holding the switching equipment responsive to establishing of the calling circuit and normally automatically operable in response to breaking of the calling circuit to release the switching equipment, a called telephone circuit selectively connectable to the calling telephone circuit in response to actuation of the dial switching equipment by the calling telephone circuit, a set of make-before-break relay contacts in the calling telephone circuit, a holding relay in the called telephone circuit operable on completion of the called telephone circuit to actuate the make-before-break relay contacts in the calling telephone circuit and anonymous call equipment operably associated with the called telephone circuit for selectively holding the calling circuit until the called circuit is broken in response to connecting the called telephone circuit to the calling telephone circuit, including means operable to energize and deenergize the holding relay at a frequency having a period shorter than the release time of the slow-to-release relay on breaking of the calling circuit.

7. Automatic dial switching telephone apparatus including a calling telephone circuit and switching equipment, a slow-to-release relay in the switching equipment responsive to the calling telephone circuit to maintain the calling telephone circuit connected to a called telephone circuit, means for holding the switching equipment responsive to establishing of the calling circuit and normally automatically operable in response to breaking of the calling circuit to release the switching equipment, a called telephone circuit selectively connectable to the calling telephone circuit in response to actuation of the dial switching equipment by the calling telephone circuit, a set of make-before-break relay contacts in the calling telephone circuit, a holding relay in the called telephone circuit operable on completion of the called telephone circuit to actuate the make-before-break relay contacts in the calling telephone circuit and anonymous call equipment operably associated with the called telephone circuit for selectively holding the calling circuit until the called circuit is broken in response to connecting the called telephone circuit to the calling telephone circuit, including means in the called telephone circuit responsive to breaking of the calling telephone circuit to partially energize the holding relay in the calling telephone circuit to engage the make contacts of the make-before-break relay contacts but not disengage the break contacts thereof to maintain the slow-to-release relay energized after breaking of the calling telephone circuit.

8. Automatic dial switching telephone apparatus comprising a calling telephone circuit including a pair of line conductors, a source of electrical energy connected across the line conductors switching equipment, a slow-to-release relay in the switching equipment responsive to the calling telephone circuit to maintain the calling telephone circuit connected to a called telephone circuit, means for holding the switching equipment responsive to establishing of the calling circuit and normally automatically operable in response to breaking of the calling circuit to release the switching equipment, a called telephone circuit selectively connectable to the calling telephone circuit in response to actuation of the dial switching equipment by the calling telephone circuit, a set of make-before-break relay contacts in the calling telephone circuit, a holding relay in the called telephone circuit operable on completion of the called telephone circuit to actuate the make-before-break relay contacts in the calling telephone circuit and anonymous call equipment operably associated with the called telephone circuit for selectively holding the calling circuit until the called circuit is broken in response to connecting the called telephone circuit to the calling telephone circuit, including a holding relay for the called telephone circuit in circuit with the source of electrical energy connected across the line conductors, a resistor, a first relay contact in series with said resistor and connected across the line conductors, a second source of electrical energy, a second relay contact, a relay coil, a second resistor in series with the relay coil, a capacitor connected across said relay coil and means for selectively connecting a capacitor into one of the line conductors and the second source of electrical energy to said relay coil through the second relay contact, whereby the first relay contact is alternately opened and closed at a frequency having a period less than the release time of the slow-to-release relay to maintain the switching equipment energized.

9. Automatic dial switching telephone apparatus comprising a calling telephone circuit including a pair of line conductors switching equipment, a slow-to-release relay in the switching equipment responsive to the calling telephone circuit to maintain the calling telephone circuit connected to the called telephone circuit, means for holding the switching equipment responsive to establishing of the calling circuit and normally automatically operable in response to breaking of the calling circuit to release the switching equipment, a called telephone circuit selectively connectable to the calling telephone circuit in response to actuation of the dial switching equipment by the calling telephone circuit, a set of make-before-break relay contacts in the calling telephone circuit and a holding relay in the called telephone circuit operable on completion of the called telephone circuit to actuate the make-before-break relay contacts in the calling telephone circuit and anonymous call equipment operably associated with the called telephone circuit for selectively holding the calling circuit until the called circuit is broken in response to connecting the called telephone circuit to the calling telephone circuit, including a resistor, a capacitor in parallel with the resistor, a choke coil and a source of electrical energy in series and means for selectively connecting the resistor, and the source of electrical energy and choke coil in series, across the line conductors with the capacitor in one of the line conductors between the choke coil and resistor, whereby the make-before-break relay contacts in the calling telephone circuit are caused to make but not break on breaking the calling telephone circuit to maintain the switching equipment energized.

References Cited in the file of this patent

UNITED STATES PATENTS

| | | |
|---|---|---|
| 2,077,537 | Taylor | Apr. 20, 1937 |
| 2,131,568 | Peterson | Sept. 27, 1938 |
| 2,200,820 | Boswau | May 14, 1940 |
| 2,879,338 | Joel | Mar. 24, 1959 |
| 3,015,698 | Pedrick | Jan. 2, 1962 |